United States Patent
Gemelli

(10) Patent No.: US 9,841,284 B2
(45) Date of Patent: Dec. 12, 2017

(54) DISTRIBUTED BAROMETER NETWORK TO ASSIST IN INDOOR NAVIGATION

(71) Applicant: Robert Bosch GmbH, Stuttgart (DE)

(72) Inventor: Marcellino Gemelli, Mountain View, CA (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 26 days.

(21) Appl. No.: 14/775,914

(22) PCT Filed: Mar. 12, 2014

(86) PCT No.: PCT/US2014/024002
§ 371 (c)(1),
(2) Date: Sep. 14, 2015

(87) PCT Pub. No.: WO2014/150693
PCT Pub. Date: Sep. 25, 2014

(65) Prior Publication Data
US 2016/0033286 A1 Feb. 4, 2016

Related U.S. Application Data

(60) Provisional application No. 61/792,166, filed on Mar. 15, 2013.

(51) Int. Cl.
*G01C 21/00* (2006.01)
*G01C 5/06* (2006.01)
(Continued)

(52) U.S. Cl.
CPC ............. *G01C 21/206* (2013.01); *G01C 5/06* (2013.01); *G01C 25/00* (2013.01); *G01L 27/002* (2013.01);
(Continued)

(58) Field of Classification Search
CPC ....... G01L 27/002; G01C 21/206; G01C 5/06; G01C 25/00; H04Q 9/00; G01S 19/48;
(Continued)

(56) References Cited

U.S. PATENT DOCUMENTS 6,434,485 B1 8/2002 Beason et al.
7,637,141 B2 * 12/2009 O'Neill ..................... G01C 5/06
73/1.59
(Continued)

FOREIGN PATENT DOCUMENTS

JP 2000-283775 A 10/2000
JP 2004-045274 A 2/2004
(Continued)

OTHER PUBLICATIONS

International Search Report corresponding to PCT Application No. PCT/US2014/024002, dated Jul. 24, 2014 (3 pages).
(Continued)

*Primary Examiner* — Nga X Nguyen
(74) *Attorney, Agent, or Firm* — Maginot Moore & Beck LLP

(57) ABSTRACT

A navigation device includes a pressure sensor, a radio, a memory including program instructions, and a controller operably connected to the pressure sensor, the radio, and the memory and configured to execute the program instructions to (i) receive at least one signal from a reference beacon of a plurality of beacons, (ii) determine a reference relationship curve correction based upon the received at least one signal, and (iii) determine an altitude of the navigation device based upon the reference relationship curve correction, and a signal from the pressure sensor.

19 Claims, 3 Drawing Sheets

(51) Int. Cl.
    *H04W 4/04* (2009.01)
    *H04W 76/02* (2009.01)
    *G01C 21/20* (2006.01)
    *H04Q 9/00* (2006.01)
    *G01L 27/00* (2006.01)
    *H04W 4/02* (2009.01)
    *G01C 25/00* (2006.01)
    *G01S 5/02* (2010.01)
    *G01S 19/40* (2010.01)
    *G01S 19/48* (2010.01)

(52) U.S. Cl.
    CPC ............ *G01S 5/0257* (2013.01); *G01S 19/40* (2013.01); *G01S 19/48* (2013.01); *H04Q 9/00* (2013.01); *H04W 4/025* (2013.01); *H04W 4/04* (2013.01); *H04W 4/043* (2013.01); *H04W 76/02* (2013.01)

(58) Field of Classification Search
    CPC ........ G01S 5/0257; G01S 19/40; H04W 4/04; H04W 4/025; H04W 4/043; H04W 76/02
    USPC .............. 701/467–469; 73/384, 386
    See application file for complete search history.

(56) References Cited

U.S. PATENT DOCUMENTS

| | | | |
|---|---|---|---|
| 2006/0265664 A1* | 11/2006 | Simons | A62B 99/00 |
| | | | 715/772 |
| 2007/0093962 A1 | 4/2007 | Swope et al. | |
| 2012/0072110 A1 | 3/2012 | Venkatraman | |
| 2012/0182180 A1 | 7/2012 | Wolf et al. | |
| 2014/0012529 A1* | 1/2014 | Lee | G01C 5/06 |
| | | | 702/94 |

FOREIGN PATENT DOCUMENTS

| | | | |
|---|---|---|---|
| JP | 2004045274 A | * | 2/2004 |
| WO | 2008148794 A2 | | 12/2008 |
| WO | 2009041846 A1 | | 4/2009 |
| WO | 2012065184 A2 | | 5/2012 |

OTHER PUBLICATIONS

Supplemental European Search Report corresponding to European Patent Application No. 14 76 9560 (6 pages).

\* cited by examiner

DISTRIBUTED BAROMETER NETWORK TO ASSIST IN INDOOR NAVIGATION

This application is a 35 U.S.C. §371 National Stage Application of PCT/US2014/024002, filed Mar. 12, 2014, which claims the benefit of priority of U.S. provisional application Ser. No. 61/792,166, filed Mar. 15, 2013, the disclosures of which are herein incorporated by reference in their entirety.

FIELD

This disclosure relates to methods and systems for determining altitude, and particularly to a method and system of calibrating an altimeter to a reference pressure for use with an indoor navigation system.

BACKGROUND

Altimeters are used to determine an altitude above a reference level, typically the mean sea level or the standard sea level. One type of altimeter determines altitude based on a measurement of atmospheric pressure. This type of altimeter is referred to as a pressure altimeter or a barometric altimeter. Atmospheric pressure is a suitable medium for determining altitude because, as altitude increases the atmospheric pressure decreases at a known rate.

Atmospheric pressure is influenced by factors including weather fronts and temperature; accordingly, before each use pressure altimeters are calibrated or aligned to a reference pressure that corresponds to a known altitude. For example, a pressure altimeter in an aircraft in flight is regularly adjusted to local sea level pressure in order to achieve a suitably accurate altitude reading.

When using a pressure altimeter to determine altitude as part of an indoor navigation system, the pressure altimeter should be calibrated to a trusted reference pressure and an associated known altitude that is as close as possible to the navigation site. Weather stations, schools, and airports are typically used as sources of trusted and reliable reference pressures and known altitudes. Problematically, these sources of trusted data are often far enough from the indoor navigation site that the atmospheric pressure at the navigation site is different from the atmospheric pressure at the source site. Additionally, in some situations the atmospheric pressure is different outside of a building as compared to the pressure inside of the building. Often, the difference in pressure is caused by heating, ventilation, and cooling equipment ("HVAC") associated with the building, for example. Accordingly, the differences in atmospheric pressure described above, typically result in an improperly calibrated pressure altimeter that generates inaccurate indoor navigation results.

Therefore, it is desirable to provide a method and a system for determining a suitable reference pressure and associated known altitude to calibrate a pressure altimeter to be used with an indoor navigation system.

SUMMARY

According to one embodiment of the disclosure a navigation device includes a pressure sensor, a radio, a memory including program instructions, and a controller operably connected to the pressure sensor, the radio, and the memory and configured to execute the program instructions to receive at least one signal from a reference beacon of a plurality of beacons, determine a reference relationship curve correction based upon the received at least one signal, and determine an altitude of the navigation device based upon (i) the reference relationship curve correction, and (ii) a signal from the pressure sensor.

According to another exemplary embodiment of the disclosure, a method of determining an altitude of a navigation device, includes receiving with a navigation device at least one signal from a reference beacon of a plurality of beacons; determining with a controller of the navigation device a reference relationship curve correction based upon the received at least one signal; and determining with the controller an altitude of the navigation device using (i) the reference relationship curve correction, and (ii) a signal from a pressure sensor of the navigation device.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
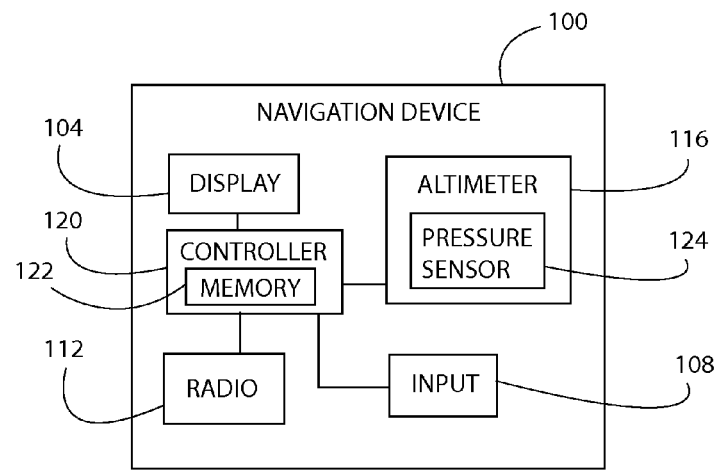
FIG. 1 is a block diagram of a navigation device that includes a pressure altimeter.

For the purpose of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

As shown in FIG. 1, a navigation device 100 includes a display 104, an input device 108, a radio 112, and an altimeter 116 each of which is connected to a controller 120. The navigation device 100 is typically a cellular phone, a smartphone, a tablet computer, or the like. In some embodiments, the navigation device 100 is a dedicated electronic navigation tool.

The display 104 is liquid crystal display that is configured to display text, images, and other visually comprehensible data. In another embodiment, the display 104 is any display as desired by those of ordinary skill in the art, including, but not limited to, an active-matrix organic light-emitting diode display.

The input device 108 is a touchscreen applied over the display 104. The input device 108 is configured to respond to the touch of a user's finger or a stylus. The input device 108 is configured to enable a user to enter text data and to manipulate objects shown on the display 104. In another embodiment, the input device 108 is a keyboard or any device configured to generate an input signal, as desired by those of ordinary skill in the art.

The radio 112, which is also referred to as a wireless transmitter and receiver, is operably connected to the controller 120 and is configured to wirelessly send and receive electronic data via a cellular network, a wireless local area network ("Wi-Fi"), a personal area network, and/or any other wireless network. Accordingly, the radio 112 is compatible with any desired wireless communication standard or protocol including, but not limited to, IEEE 802.11, IEEE 802.15.1 ("Bluetooth"), Global System for Mobiles ("GSM"), and Code Division Multiple Access ("CDMA"). Additionally, in at least some embodiments, the radio 112 includes a GPS receiver and/or is otherwise configured to receive signals and determine its position on the Earth using a satellite navigation system, such as the Global Positioning System ("GPS").

The altimeter 116 includes a pressure sensor 124 and is operably connected to the controller 120. The altimeter 116 is configured to generate an electrical signal based on a present altitude of the navigation device 100 by sensing the atmospheric/barometric pressure in the area near the navigation device. The altimeter 116 is further configured to be calibrated (or aligned) with a known reference atmospheric pressure and a known altitude that is associated with the known reference atmospheric pressure. The altimeter 116 includes electronic circuitry (not shown) that is configured to calculate its present altitude based on a known relationship between (i) the sensed atmospheric pressure, (ii) the known reference atmospheric pressure, and (iii) the known altitude that is associated with the known reference atmospheric pressure.

The controller 120 includes at least a processor (not shown) and a memory 122 configured to store program instructions (i.e. software). The controller 120 is operably connected to the memory 122 and is configured to execute the program instructions for operating the components connected thereto, such as the display 104, the input device 108, the radio 112, and the altimeter 116. In particular, the controller 120 is configured to cause the display 104 to show a map of the region in which the navigation device 100 is located and to display the altitude of the navigation device.

A power supply (not shown) supplies the controller 120 and the components connected thereto with electrical power. In one embodiment, the power supply is a battery, such as a lithium-ion battery or any other battery, as desired by those of ordinary skill in the art.

In operation, the navigation device 100 is configured to calibrate the altimeter using a selected beacon (the details of which are described below) that is likely to supply the most accurate reference atmospheric pressure and reference altitude available to the navigation device based on the current position of the navigation device.

Figure 2:
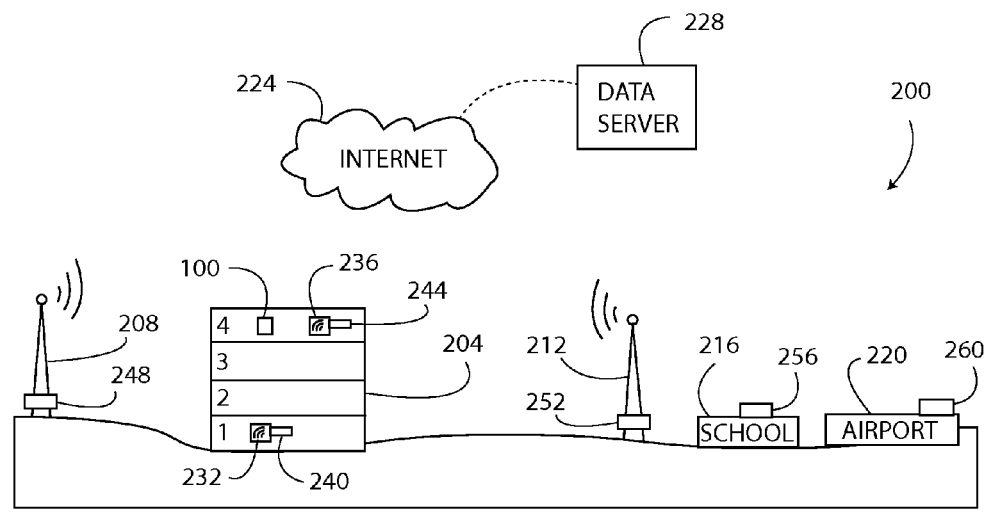
FIG. 2 is a block diagram of a multilevel indoor navigation site and its surrounding area, the block diagram is not shown to scale.

With reference to FIG. 2, an exemplary setting 200 is depicted that includes a four story building 204, a left cell phone tower 208, a right cell phone tower 212, a school 216, and an airport 220. The setting 200 is in a location that has access to the internet 224. An exemplary data server 228 is shown as being connected to the internet 224.

The building 204 is an exemplary multistory building, such as an office tower, a hospital, a government building, a commercial shopping center, or any other structure in which a user desires indoor navigation assistance from the navigation device 100. The building 204 includes a Wi-Fi hotspot 232 located on a first floor of the building and another Wi-Fi hotspot 236 located on a fourth floor of the building. The hotspots 232, 236 enable the navigation device 100 to connect to the internet 224 via a wired or a wireless connection.

Each hotspot 232, 236 includes a barometer unit 240, 244 that is configured to sense the atmospheric pressure in the region surrounding the hotspot. In particular, the hotspot 232 measures the atmospheric pressure on the first floor of the building 204, and the hotspot 236 measures the atmospheric pressure on the fourth floor of the building. The barometers units 240, 244 are at least sensitive enough to determine a difference in atmospheric pressure between the first and fourth floors of the building 204 (an altitude difference of approximately ten meters). The hotspots 232, 236 wirelessly broadcast the atmospheric pressures as sensed by the barometer units 240, 244 autonomously and continuously in approximately real time.

The cell phone tower 208 includes a barometer unit 248 configured to sense the atmospheric pressure in the region surrounding the cell phone tower 208. The cell phone tower 208 is a typical cellular communication tower except that in addition to sending and receiving cellular signals, the cell phone tower 208 broadcasts the atmospheric pressure sensed by the barometer unit 248 in approximately real time.

The cell phone tower 212 includes a barometer unit 252 configured to sense the atmospheric pressure in the region surrounding the cell phone tower 212. The cell phone tower 212 is a typical cellular communication tower except that in addition to sending and receiving cellular signals, the cell phone tower 212 broadcasts the atmospheric pressure sensed by the barometer unit 252 in approximately real time. The cell phone tower 212 is located farther from the building 204 than the cell phone tower 208. For example, the cell phone tower 208 is located three kilometers from the building 204, and the cell phone tower 212 is located six kilometers from the building 204.

The school 216 is an example of a structure that typically includes an internet-connected weather station. In particular, the school 216 includes a barometer unit 256 that is configured to sense the atmospheric pressure in the region surrounding the school. The barometer unit 256 is connected to the internet 224, and the atmospheric pressure sensed by the barometer unit is uploaded to an internet server in approximately real time. The school 216 is located farther from the building 204 than the cell phone tower 212. For example, the school 216 is located approximately ten kilometers from the building 204.

The airport 220 is another example of a structure that typically includes an internet-connected weather station. The airport 220 includes a barometer unit 260 that is configured to sense the atmospheric pressure in the region surrounding the airport. The barometer unit 260 is connected to the internet 224, and the atmospheric pressure sensed by the barometer unit is uploaded to an internet server in approximately real time. The airport 220 is located farther from the building 204 than the school 256. For example, the airport 220 is located approximately fifteen kilometers from the building 204.

In the exemplary setting 200 of FIG. 2, the navigation device 100 is positioned on the fourth floor of the building 204. In order to serve as a navigation device 100 within the building 204, the navigation device determines on which floor of the building it is located, and then it displays a floor plan of that floor and the user's position on that particular floor on the display 104. To determine on which floor the navigation device 100 currently located it compares its present altitude with known altitudes of each floor; accordingly, it is typically desirable for the altimeter 116 to be accurately calibrated.

Figure 3:
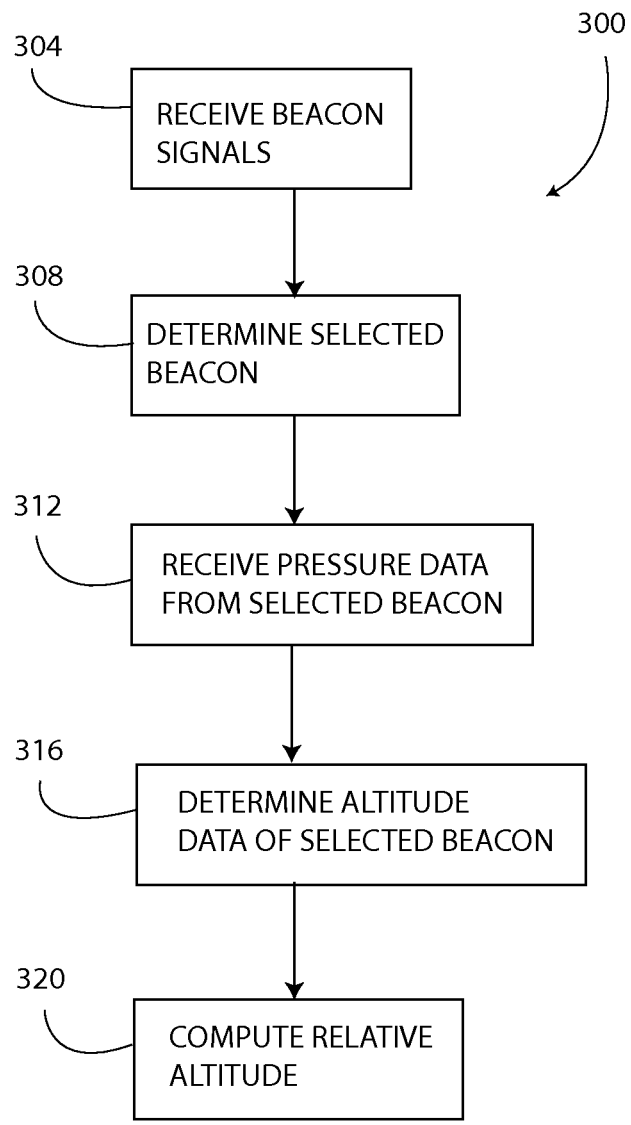
FIG. 3 is a flowchart illustrating a method of operating the navigation device of FIG. 1.

As shown in FIG. 3, the navigation device 100 uses the method 300, which is stored in the memory 122 or on the internet 224 (FIG. 2) to calibrate the altimeter 116. In block 304, the navigation device 100 wirelessly receives broadcast signals from nearby beacons. The term "beacon," as used herein, refers to a device that broadcasts a signal that includes at least atmospheric pressure data. In the setting 200 of FIG. 2, the left cell tower 208, the right cell tower 212, the first floor hotspot 232, and the fourth floor hotspot 236 are beacons. Also, in at least one embodiment, the school 216 and the airport 220 are considered beacons since the atmospheric pressure data that they collect is available via a connection to the internet 224.

Next in block 308, the navigation device 100 determines a selected beacon by determining which of the beacons is nearest to the navigation device. The navigation device determines the distance between itself and each beacon using any distance determining method, as desired by those of ordinary skill in the art. An exemplary distance determining method includes determining location data of the navigation device 100 using a GPS position of the navigation device 100 to a GPS location of each beacon. The location data of the beacons is typically stored in a data server 228 that may be queried by the radio 112 or otherwise available through the internet 224. Another exemplary distance determining method includes using algorithms based on the signal strength of the beacons that broadcast a wireless signal. Alternatively, in another embodiment, the user chooses the selected beacon by viewing the available beacons as shown on the display 104 and then using the input device 108 to choose the selected beacon. In the exemplary setting 200, the selected beacon is the fourth floor hotspot 236, since this beacon is closest to the location of the navigation device 100.

After determining the selected beacon, next in block 312, the navigation device 100 receives reference pressure data broadcast by the selected beacon. Since the selected beacon is the nearest beacon to the navigation device 100, the pressure data broadcast by the selected beacon provides the best available reference atmospheric pressure data.

In block 316, next the navigation device 100 determines the reference altitude corresponding to the reference atmospheric pressure broadcast by the selected beacon. To determine the reference altitude, the navigation device 100 receives the "name" of the beacon from the broadcast signal, establishes a communication link with the data server 228 using the radio 112, and then queries the data server 228 (or another localization service, such as Google Maps) via a wireless connection to the internet 224. The data server 228 includes reference altitude data for the selected beacon. The navigation device 100 downloads the reference altitude data for the selected beacon and uses the data as the reference altitude.

Figure 4:
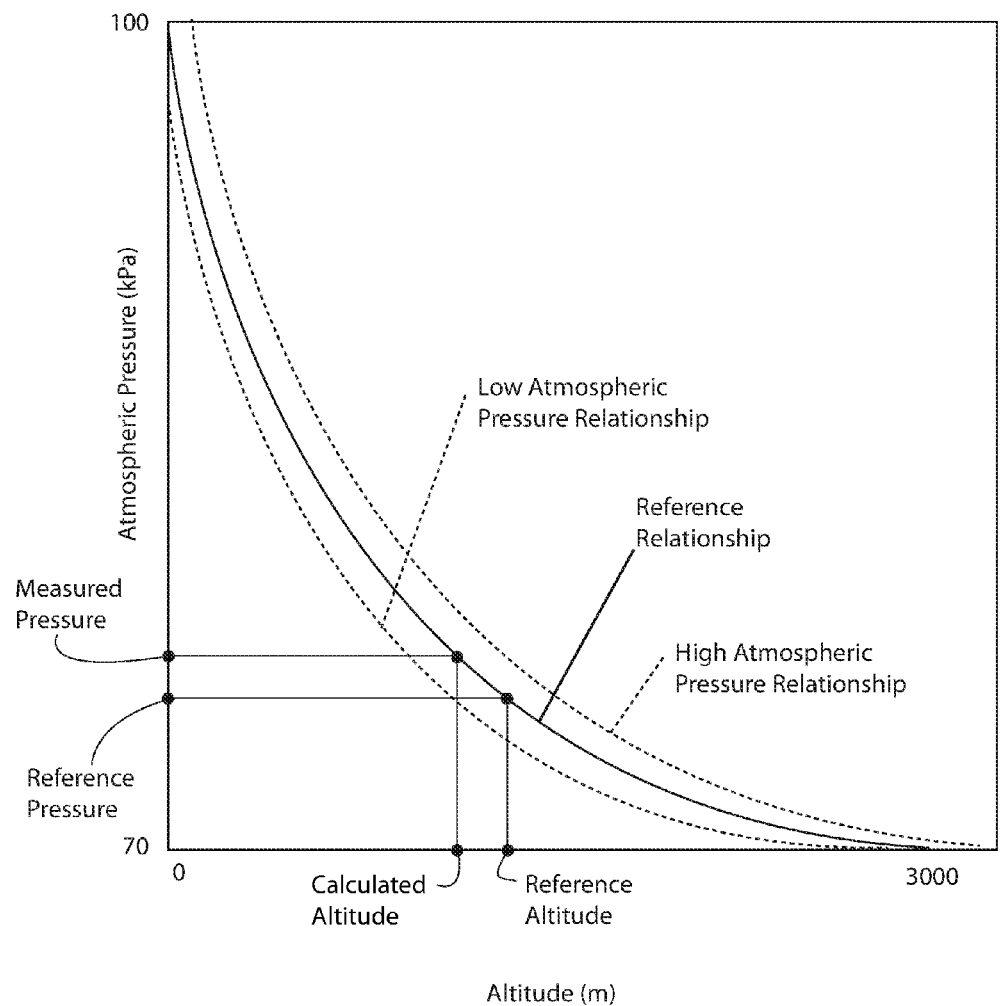
FIG. 4 is a graph depicting atmospheric pressure versus altitude.

Next, in block 320 and with reference to FIG. 4, after having determined a reference pressure and a corresponding reference altitude, the navigation device 100 calibrates the altimeter 116. As used herein the terms "calibrating" and "aligning" include determining the position of a reference relationship curve on the graph of FIG. 4. As an example, a relationship corresponding to an exemplary period of "low" atmospheric pressure and a relationship corresponding to an exemplary period of "high" atmospheric pressure are shown. The difference in pressure between the curves is exaggerated in FIG. 4, for clarity of explanation. The navigation device 100 calibrates the altimeter by "aligning" the reference relationship curve with the point on the graph that corresponds to the reference pressure and the reference altitude. In one embodiment, the navigation device 100 determines at least one pressure factor, which also referred to herein as a curve correction, that is used to scale or to bias the reference relationship curve into alignment with the reference pressure and the reference altitude.

After the altimeter 116 is calibrated the navigation device 100 is ready to determine its present altitude and the location of the user within the building 204 including the floor on which the user (and the navigation device) is located. The present altitude of the navigation device 100 is determined based upon the reference relationship curve correction and the pressure sensed by the pressure sensor 124, which provides device pressure data.

The method 300 results in a more accurately calibrated altimeter 116 than a calibration method that uses a reference atmospheric pressure and a reference altitude originating from a location far removed from the navigation device 100. For example, instead of performing the method 300, the navigation device 100 could have queried the internet 224 to receive a reference atmospheric pressure and a reference altitude as determined by the airport 260. The airport 260, however, is located many kilometers from the navigation device 100 and it is likely that due to local weather conditions (and other factors) the atmospheric pressure is at least slightly different at the building 204, thereby resulting in a less accurately calibrated altimeter.

Additionally, method 300 results in a very accurately calibrated altimeter 116 when the reference atmospheric pressure is measured in the same interior space as the navigation device 100, since the reference atmospheric pressure accounts for indoor pressure fluctuations caused by such things as open windows and heating, ventilation, and cooling equipment (i.e. HVAC equipment).

Furthermore, the method 300 typically results in an altimeter 116 that is calibrated more accurately than an altimeter that is calibrated using crowd sensing. In crowd sensing the sensor to be calibrated relies on data from sensors built into consumer devices whose users voluntarily decide to broadcast the sensor data (including atmospheric pressure). The performance and location of these devices are not typically audited or certified, and therefore the accuracy of the data from these sources is questionable and not suitable for indoor navigation.

In another embodiment, the beacons broadcast atmospheric pressure from a barometer unit located remotely from the broadcast beacon. For example, the right cell phone tower 212 if not equipped with the barometer unit 252 could broadcast the atmospheric pressure data of the barometer unit 256 located at the school 216. In this situation, the navigation device 100 queries the internet 224 to determine the position and altitude of the barometer unit 256 and not the position and altitude of the cell phone tower 212.

In yet another embodiment, the beacons transmit the atmospheric pressure data to the data server 228 instead of broadcasting the atmospheric pressure data directly to the navigation device 100. In this embodiment, the navigation device 100 receives the reference atmospheric pressure and the reference altitude from the data server 228.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A navigation device, comprising:
   a pressure sensor;
   a radio;
   a memory including program instructions; and
   a controller operably connected to the pressure sensor, the radio, and the memory and configured to execute the program instructions
      to receive at least one signal from a reference beacon of a plurality of beacons, the at least one signal including reference pressure data representative of an atmospheric pressure sensed by a barometer unit of the reference beacon,
      to receive reference altitude data representative of an altitude of the reference beacon,
      to determine a reference relationship curve correction by comparing a corresponding point of a reference relationship curve to the atmospheric pressure sensed by the barometer unit and the altitude of the reference beacon, the reference relationship curve is a relationship between an altitude of the navigation device and an atmospheric pressure at the navigation device,
      to scale the reference relationship curve based on the reference relationship curve correction, and
      to determine the altitude of the navigation device based upon (i) the scaled reference relationship curve, and (ii) a signal from the pressure sensor corresponding to the atmospheric pressure at the navigation device.

2. The navigation device of claim 1, wherein the controller is further configured to execute the program instructions to:
   establish a communication link with a data server using the radio;
   query the data server to determine the altitude of the reference beacon; and
   obtain the reference altitude data from the data server through the communication link.

3. The navigation device of claim 1, further comprising:
   a display operably connected to the controller,
   wherein the controller is further configured to execute the program instructions to:
      display a listing of the beacons of the plurality of beacons on the display, and
      reference a beacon of the plurality of beacons that is selected by a user of the navigation device as the reference beacon.

4. The navigation device of claim 1, wherein the controller is further configured to execute the program instructions to:
   calculate a distance of each of the beacons of the plurality of beacons from the navigation device; and
   select the beacon of the plurality of beacons that is nearest to the navigation device.

5. The navigation device of claim 4, wherein the controller is further configured to execute the program instructions to:
   determine device location data of the navigation device;
   establish a communication link with a data server using the radio;
   query the data server to determine a location of each of the beacons of the plurality of beacons;
   obtain beacon location data from the data server through the communication link; and
   calculate the distance of each of the beacons of the plurality of beacons from the navigation device based upon the device location data and the beacon location data.

6. The navigation device of claim 5, wherein:
   the radio includes a GPS receiver; and
   the controller is further configured to execute the program instructions to determine the device location data based upon signals received by the GPS receiver.

7. The navigation device of claim 1, wherein the controller is further configured to execute the program instructions to scale an altitude formula based upon the reference relationship curve correction.

8. The navigation device of claim 7, wherein the controller is further configured to execute the program instructions to:
   determine device pressure data from the signal from the pressure sensor of the navigation device, the device pressure data corresponding to the atmospheric pressure at the navigation device.

9. The navigation device of claim 8, wherein the signal from the pressure sensor of the navigation device is based upon a barometric pressure.

10. A method of determining an altitude of a navigation device, comprising:
    receiving with a navigation device at least one signal from a reference beacon of a plurality of beacons including reference pressure data representative of an atmospheric pressure sensed by a barometer unit of the reference beacon;
    receiving reference altitude data representative of an altitude of the reference beacon, wherein the atmospheric pressure sensed by the barometer unit and the altitude of the reference beacon corresponds to a reference point;
    determining with a controller of the navigation device a reference relationship curve correction by comparing a corresponding point of a reference relationship curve to the reference point, wherein the reference relationship curve is a relationship between an altitude of the navigation device and an atmospheric pressure at the navigation device;
    scaling the reference relationship curve based on the reference relationship curve correction, by moving the reference relationship curve so that the corresponding point of the reference relationship curve is aligned with the reference point; and
    determining with the controller the altitude of the navigation device using (i) the scaled reference relationship curve, and (ii) a signal from a pressure sensor of the navigation device corresponding to the atmospheric pressure at the navigation device.

11. The method of claim 10, further comprising:
    establishing a communication link with a data server using the navigation device;
    querying the data server to determine the altitude of the reference beacon; and
    obtaining the reference altitude data from the data server through the communication link.

12. The method of claim 10, further comprising:
    displaying a listing of the beacons of the plurality of beacons on a display of the navigation device; and
    referencing a beacon of the plurality of beacons that is selected by a user of the navigation device as the reference beacon.

13. The method of claim 10, further comprising:
  determining a distance of each of the beacons of the plurality of beacons from the navigation device; and
  selecting the beacon of the plurality of beacons that is nearest to the navigation device.

14. The method of claim 13, wherein the determining a distance of each of the beacons includes:
  determining device location data of the navigation device;
  establishing a communication link with a data server using the navigation device;
  querying the data server to determine a location of each of the beacons of the plurality of beacons;
  obtaining beacon location data from the data server through the communication link; and
  calculating the distance of each of the beacons of the plurality of beacons from the navigation device based upon the device location data and the beacon location data.

15. The method of claim 10, further comprising:
  scaling an altitude formula based upon the reference relationship curve correction.

16. The method of claim 15, further comprising:
  determining device pressure data from the signal from the pressure sensor of the navigation device, the device pressure data corresponding to the atmospheric pressure at the navigation device.

17. The method of claim 16, wherein the signal from the pressure sensor of the navigation device is based upon a barometric pressure.

18. The method of claim 10, wherein a user selects the reference beacon of the plurality of beacons using a touchscreen of the navigation device.

19. The navigation device of claim 1, wherein:
  the atmospheric pressure sensed by the barometer unit and the altitude of the reference beacon corresponds to a reference point, and
  scaling the reference relationship curve includes moving the reference relationship curve so that the corresponding point of the reference relationship curve is aligned with the reference point.

\* \* \* \* \*